US010375717B2

(12) United States Patent
Liu

(10) Patent No.: US 10,375,717 B2
(45) Date of Patent: Aug. 6, 2019

(54) USER EQUIPMENT AND DATA TRANSMISSION METHOD THEREOF

(71) Applicant: Beijing Spreadtrum Hi-Tech Communications Technology Co., Ltd., Beijing (CN)

(72) Inventor: Yang Liu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 32 days.

(21) Appl. No.: 15/402,022

(22) Filed: Jan. 9, 2017

(65) Prior Publication Data

US 2017/0325257 A1 Nov. 9, 2017

(30) Foreign Application Priority Data

May 9, 2016 (CN) .......................... 2016 1 0302811

(51) Int. Cl.
*H04L 5/00* (2006.01)
*H04W 72/04* (2009.01)
*H04W 72/12* (2009.01)

(52) U.S. Cl.
CPC ....... *H04W 72/1263* (2013.01); *H04L 5/0053* (2013.01); *H04W 72/042* (2013.01); *H04W 72/1289* (2013.01)

(58) Field of Classification Search
CPC ......... H04W 72/0406; H04W 72/0413; H04W 72/042; H04W 72/0446; H04W 72/0453; H04W 72/1268; H04W 72/1284; H04W 72/1289; H04W 72/14
See application file for complete search history.

(56) References Cited

U.S. PATENT DOCUMENTS 9,807,747 B2 * 10/2017 Hsieh .................. H04W 72/042
9,826,540 B1 * 11/2017 Li ......................... H04L 1/1812
9,894,654 B2 * 2/2018 Astely .................. H04L 5/0037
(Continued)

FOREIGN PATENT DOCUMENTS

CN 104468030 A 3/2015
CN 107889228 A * 4/2018
(Continued)

OTHER PUBLICATIONS

Samsung, Tdoc: R1-160585: Specification impact for DL due to TTI shortening, Feb. 19, 2016, 3GPP TSG RAN WG1 Meeting #84 (Year: 2016).*

(Continued)

*Primary Examiner* — Eric Nowlin
(74) *Attorney, Agent, or Firm* — Vierra Magen Marcus LLP

(57) ABSTRACT

A UE and a data transmission method thereof are provided. The method includes: acquiring configuration information of a first shortened TTI sent by a base station; blindly detecting a predetermined physical downlink link control channel with a period of the first shortened TTI, until primary DCI corresponding to the UE is acquired; determining secondary DCI corresponding to the UE based on the acquired primary DCI; and performing data transmission with the base station in a second shortened TTI scheduled by the secondary DCI. Flexibility of application of a shortened TTI may be improved, and resources may be saved.

16 Claims, 5 Drawing Sheets

UE
base station
accesses randomly and establishes an RRC connection S201
configures a physical downlink link control channel sPDCCH S202
transmits configuration information of a first shortened TTI S203
blindly detects a predetermined physical downlink link control channel with a period of the first shortened TTI, until primary DCI corresponding to the UE is acquired S204
blindly detects the physical downlink link control channel to acquire the secondary DCI corresponding to the UE S205
performs data transmission with the base station in a second shortened TTI S206
starts to blindly detect the physical downlink link control channel again from a next shortened TTI to acquire next primary DCI S207

(56) References Cited

U.S. PATENT DOCUMENTS 9,929,842 B2 * 3/2018 Xu .................... H04W 52/325
10,069,613 B2 * 9/2018 Nory .................... H04L 5/0055
10,117,188 B2 * 10/2018 Nory .................... H04L 1/1854
10,172,156 B2 * 1/2019 Nory .................... H04L 5/0007
2017/0135127 A1 * 5/2017 Nogami ............ H04W 72/1289
2017/0164363 A1 6/2017 Zhang et al.
2017/0222759 A1 * 8/2017 Meng .................... H04L 1/0083
2017/0230994 A1 * 8/2017 You .................... H04W 72/042
2017/0244535 A1 * 8/2017 Islam .................. H04B 7/2615
2017/0251465 A1 * 8/2017 Andersson ............ H04L 5/0037
2017/0251466 A1 * 8/2017 Astely .................. H04L 5/0037
2017/0290008 A1 * 10/2017 Tooher .................. H04L 1/0007
2017/0325257 A1 * 11/2017 Liu .................... H04W 72/042
2017/0332365 A1 * 11/2017 Lin .................. H04W 72/0406
2017/0332377 A1 * 11/2017 Tseng .................... H04W 24/00
2017/0332386 A1 * 11/2017 Li .................... H04L 1/1812
2017/0332397 A1 * 11/2017 Li .................... H04L 1/1861
2017/0366311 A1 * 12/2017 Iyer .................... H04L 5/005
2018/0048451 A1 * 2/2018 Yin .................... H04L 5/0055
2018/0049166 A1 * 2/2018 Sun .................. H04W 72/0446
2018/0049175 A1 * 2/2018 Bagheri ................ H04L 5/0048
2018/0049189 A1 * 2/2018 Hugl .................. H04W 72/042
2018/0049271 A1 * 2/2018 Bagheri ................ H04W 76/28
2018/0049272 A1 * 2/2018 Bagheri ................ H04W 76/28
2018/0076942 A1 * 3/2018 Nory .................... H04L 5/0055
2018/0077651 A1 * 3/2018 Nory .................... H04L 1/1854
2018/0077658 A1 * 3/2018 Nory .................. H04W 52/365
2018/0077718 A1 * 3/2018 Nory .................... H04L 5/0055
2018/0077719 A1 * 3/2018 Nory .................... H04L 1/0018
2018/0077721 A1 * 3/2018 Nory .................... H04L 5/0007
2018/0115984 A1 * 4/2018 Sahlin ............... H04W 72/1268
2018/0132211 A1 * 5/2018 Huang .................... H04L 5/00
2018/0132272 A1 * 5/2018 Sun .................... H04W 48/12
2018/0139012 A1 * 5/2018 Hosseini ............... H04L 1/1816
2018/0212732 A1 * 7/2018 You .................... H04L 5/0051
2018/0227939 A1 * 8/2018 Bagheri ................ H04L 5/0044
2018/0242347 A1 * 8/2018 Sahlin ............... H04W 72/1268
2018/0262398 A1 * 9/2018 Chen .................... H04W 72/12
2018/0279305 A1 * 9/2018 Bagheri ............ H04W 72/0446
2018/0279344 A1 * 9/2018 Bagheri ............ H04W 72/0446
2018/0287742 A1 * 10/2018 Feng .................... H04L 1/1812
2018/0309489 A1 * 10/2018 Hosseini .............. H04B 7/0626
2018/0323939 A1 * 11/2018 Nory .................... H04L 5/0055
2018/0324834 A1 * 11/2018 Sebire .................... H04L 1/00
2018/0332605 A1 * 11/2018 Pelletier ............ H04W 72/1242
2018/0375613 A1 * 12/2018 Byun .................... H04L 1/0061
2018/0375636 A1 * 12/2018 You .................... H04L 5/0092
2018/0376464 A1 * 12/2018 Hosseini ............. H04W 72/042
2018/0376495 A1 * 12/2018 Lee .................. H04W 72/1289
2018/0376497 A1 * 12/2018 You .................. H04W 72/1294

FOREIGN PATENT DOCUMENTS

WO WO-2016040290 A1 * 3/2016 ........... H04L 1/0007
WO 2016069270 A1 5/2016
WO WO-2017136592 A1 * 8/2017 .......... H04W 72/042
WO WO-2017164920 A1 * 9/2017 ............... H04L 1/00
WO WO-2017166090 A1 * 10/2017 ............ H04W 72/04
WO WO-2017166294 A1 * 10/2017 ............ H04W 28/06
WO WO-2017193349 A1 * 11/2017 ............... H04L 1/00
WO WO-2018059221 A1 * 4/2018

OTHER PUBLICATIONS

Samsung, Tdoc: R1-162588: DCI design for short TTI, Apr. 15, 2016, 3GPP, 3GPP TSG RAN WG1 Meeting #84bis (Year: 2016).*
Ericsson, Tdoc: R1-163322: Downlink control signaling for short TTI, Apr. 15, 2016, 3GPP, 3GPP TSG RAN WG1 Meeting #84bis (Year: 2016).*
Huawei et al., Tdoc: R164059: sPDCCH design for short TTI, May 27, 2016, 3GPP, 3GPP TSG RAN WG1 Meeting #85 (Year: 2016).*
Huawei et al., Tdoc: R164060: DCI dsign for short TTI, May 27, 2016, 3GPP, 3GPP TSG RAN WG1 Meeting #85 (Year: 2016).*
LG Electronics, Tdoc: R1-164542: Discussions on DCI and sPDCCH for latency reduction, May 27, 2016, 3GPP, 3GPP TSG RAN WG1 Meeting #85 (Year: 2016).*
Huawei et al, Tdoc:R1-166148: sPDCCH design for short TTI, Aug. 26, 2016, 3GPP, 3GPP TSG RAN WG1 Meeting #86 (Year: 2016).*
Huawei et al, Tdoc:R1-166149: Details of two-level DCI schemes for short TTI, Aug. 26, 2016, 3GPP, 3GPP TSG RAN WG1 Meeting #86 (Year: 2016).*
Huawei et al, Tdoc:R1-166150: Discussion on DCI design for short TTI, Aug. 26, 2016, 3GPP, 3GPP TSG RAN WG1 Meeting #86 (Year: 2016).*
Huawei et al., Tdoc: R1-1608365: Discussion on DCI design for short TTI, Oct. 14, 2016, 3GPP, 3GPP TSG RAN WG1 Meeting #86bis (Year: 2016).*
Office Action dated May 13, 2018, in Chinese Patent Application No. 201610302811.6.
Spreadtrum Communications, Tdoc: "R1-162545: Discussions on DL Control Channel Design for Short TTI", Apr. 15, 2016, 3Gpp TSG RAB WG1 Meeting #84.

* cited by examiner

USER EQUIPMENT AND DATA TRANSMISSION METHOD THEREOF

CROSS-REFERENCE TO RELATED APPLICATIONS

The present application claims priority to Chinese patent application No. 201610302811.6, filed on May 9, 2016, and entitled "USER EQUIPMENT AND DATA TRANSMISSION METHOD THEREOF", and the entire disclosure of which is incorporated herein by reference.

TECHNICAL FIELD

The present disclosure generally relates to radio communication technology, and more particularly, to a user equipment and a data transmission method thereof.

BACKGROUND

Transmission Time Interval (TTI) which determines a scheduling mode of time-frequency resources is an essential parameter in a radio communication system, such as a Long-Term Evolution (LTE) system. A relatively short TTI benefits various radio communication service, however, it also causes some problems, for example, more control overhead of the radio communication system.

Among current radio internet service, Transmission Control Protocol (TCP) based service becomes the most popular one. Most of the TCP service, such as browse of a webpage or play of a short video, has a great data rate and a short life cycle. For TCP, an initial size of a window is relatively small. And the size of the window will not become greatest unless multiple times of round-trip data transmission are performed accurately. Therefore, an activation procedure for TCP is relatively slow. Generally, assuming that a channel is in an ideal state, an activation rate is related to the initial size of the window and a Round-Trip Time (RTT). However, as there are a variety of standards for internet device, the initial size of the window and a threshold of congestion control cannot be too great, which causes RTT to be an essential factor of rapidly promoting the amount of transmitted data for a broadband network.

In radio communication systems, such as the LTE system, it is found that shortening TTI can greatly reduce an air interface delay based on the search on factors that influence the throughput of applications of TCP. However, existing technologies for shortening TTI have many problems, such as being not adaptive to all kinds of User Equipment (UE) or having great system overhead.

SUMMARY

By embodiments of the present disclosure, flexibility of application of a shortened TTI may be improved, and resources may be saved.

In an embodiment of the present disclosure, a data transmission method of UE is provided, including: acquiring configuration information of a first shortened TTI sent by a base station; blindly detecting a predetermined physical downlink link control channel with a period of the first shortened TTI, until primary Downlink Control Information (DCI) corresponding to the UE is acquired; determining secondary DCI corresponding to the UE based on the acquired primary DCI; and performing data transmission with the base station in a second shortened TTI scheduled by the secondary DCI.

Optionally, the configuration information of the first shortened TTI may include a number of Orthogonal Frequency-Division Multiplexing (OFDM) symbols contained in the first shortened TTI.

Optionally, determining secondary DCI corresponding to the UE based on the acquired primary DCI may include: acquiring configuration information of the secondary DCI by analyzing the primary DCI; and blindly detecting the predetermined physical downlink link control channel based on the configuration information of the secondary DCI, to acquire the secondary DCI corresponding to the UE.

Optionally, the configuration information of the secondary DCI may include a format, an effective time and a position of the secondary DCI.

Optionally, the position of the secondary DCI may be determined by bit mapping.

Optionally, determining secondary DCI corresponding to the UE based on the acquired primary DCI may include: analyzing the primary DCI to acquire the secondary DCI which is set in the primary DCI.

Optionally, the primary DCI may include configuration information of an exit frame number.

Optionally, the method may further include: when a frame number of transmitted data exceeds the exit frame number, starting to blindly detect the predetermined physical downlink link control channel again from a next shortened TTI to acquire next primary DCI.

Optionally, if the exit frame number is greater than one, shortened TTIs scheduled by the secondary DCI may be located at a same position in each sub-frame corresponding to the exit frame number.

Optionally, the secondary DCI may include an exit indicator.

Optionally, the method may further include: when a frame number of transmitted data does not exceed the exit frame number and the exit indicator is detected to be valid, blindly detecting the predetermined physical downlink link control channel again to acquire next primary DCI corresponding to the UE.

In an embodiment of the present disclosure, a UE is provided, including: a configuration acquiring circuitry, configured to acquire configuration information of a first shortened TTI sent by a base station; a blindly detecting circuitry, configured to blindly detect a predetermined physical downlink link control channel with a period of the first shortened TTI, until primary DCI corresponding to the UE is acquired; a secondary DCI determining circuitry, configured to determine secondary DCI corresponding to the UE based on the acquired primary DCI; and a transmission circuitry, configured to perform data transmission with the base station in a second shortened TTI scheduled by the secondary DCI.

Optionally, the configuration information of the first shortened TTI may include a number of OFDM symbols contained in the first shortened TTI.

Optionally, the secondary DCI determining circuitry may be configured to: acquire configuration information of the secondary DCI by analyzing the primary DCI; and blindly detect the predetermined physical downlink link control channel based on the configuration information of the secondary DCI, to acquire the secondary DCI corresponding to the UE.

Optionally, the configuration information of the secondary DCI may include a format, an effective time and a position of the secondary DCI.

Optionally, the position of the secondary DCI may be determined by bit mapping.

Optionally, the secondary DCI determining circuitry may be configured to analyze the primary DCI to acquire the secondary DCI which is set in the primary DCI.

Optionally, the primary DCI may include configuration information of an exit frame number.

Optionally, the blindly detecting circuitry may be further configured to: when a frame number of transmitted data exceeds the exit frame number, start to blindly detect the predetermined physical downlink link control channel again from a next shortened TTI to acquire next primary DCI.

Optionally, if the exit frame number is greater than one, shortened TTIs scheduled by the secondary DCI may be located at a same position in each sub-frame corresponding to the exit frame number.

Optionally, the secondary DCI may include an exit indicator.

Optionally, the blindly detecting circuitry may be further configured to: when a frame number of transmitted data does not exceed the exit frame number and the exit indicator is detected to be valid, blindly detect the predetermined physical downlink link control channel again to acquire next primary DCI corresponding to the UE.

Embodiments of the present disclosure may provide following advantages. Based on the configuration information of shortened TTIs received from the base station, the UE blindly detects the predetermined physical downlink link control channel with a period of each shortened TTI, to acquire the primary DCI. Besides, the UE determines the secondary DCI based on the acquired primary DCI to schedule to the corresponding shortened TTI within which data transmission is performed between the UE and the base station. In this way, the UE may switch between blind detection of channel and scheduling of the primary DCI, which makes the shortened TTIs be scheduled flexibly in a simple way and applicable to various UEs.

Further, before the frame number of transmitted data reaches the exit frame number, the secondary DCI is determined based on the primary DCI acquired by the blind detection, to realize the scheduling of the UE in multiple sub-frames, which may reduce signaling overhead and save resources.

Further, when it is determined that a data frame needed to be transmitted ends, the exit indicator may be set in the secondary DCI to terminate the scheduling of the UE in advance before the exit frame number is reached, which may further save resources.

DETAILED DESCRIPTION

As described in the background, existing technologies for shortening TTI have many problems, such as being not applicable to various UEs or having great system overhead.

In embodiments of the present disclosure, based on the configuration information of shortened TTIs received from the base station, the UE blindly detects the predetermined physical downlink link control channel with a period of each shortened TTI, to acquire the primary DCI. Besides, the UE determines the secondary DCI based on the acquired primary DCI to schedule to the corresponding shortened TTI within which data transmission is performed between the UE and the base station. In this way, the UE may switch between blind detection of channel and scheduling of the primary DCI, which makes the shortened TTIs be scheduled flexibly in a simple way and applicable to various UEs.

In order to clarify the object, solutions and advantages of embodiments of the present disclosure, embodiments of present disclosure will be described clearly in detail in conjunction with accompanying drawings.

Figure 1:
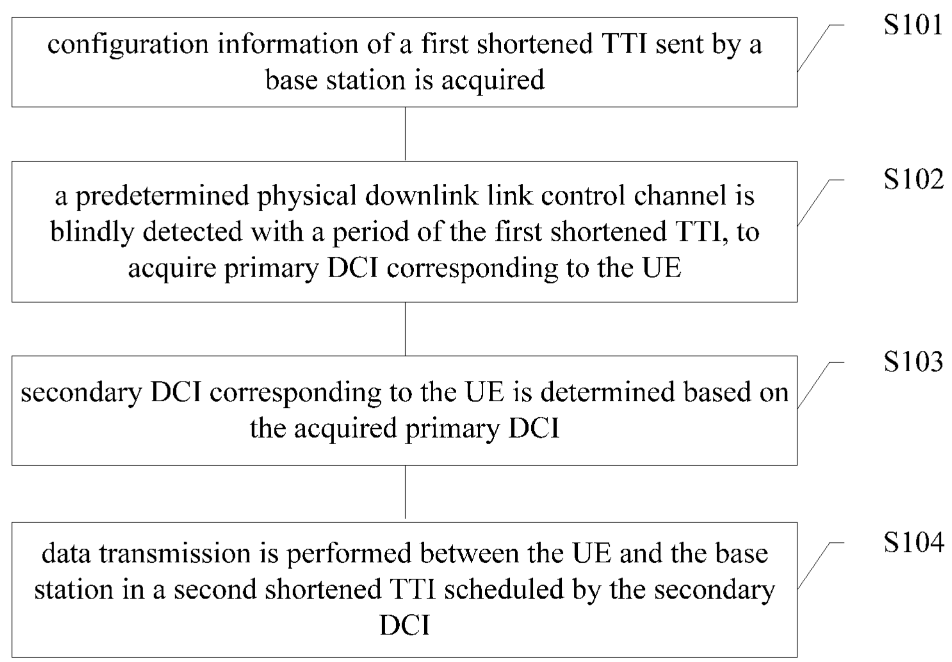
FIG. 1 schematically illustrates a flow chart of a data transmission method of UE according to an embodiment.

FIG. 1 schematically illustrates a flow chart of a data transmission method of UE according to an embodiment. Referring to FIG. 1, the method may include S101 to S104.

In S101, configuration information of a first shortened TTI sent by a base station is acquired.

In some embodiments, the configuration information of the first shortened TTI may include a number of OFDM symbols contained in the first shortened TTI.

In S102, a predetermined physical downlink link control channel is blindly detected with a period of the first shortened TTI, to acquire primary DCI corresponding to the UE.

In some embodiments, when determining the configuration information of the first shortened TTI sent by the base station, the UE may blindly detect the predetermined physical downlink link control channel (called sPDCCH) with a period of each shortened TTI (i.e., in each shortened TTI), to acquire the primary DCI corresponding to the UE.

In S103, secondary DCI corresponding to the UE is determined based on the acquired primary DCI.

In some embodiments, the secondary DCI may correspond to the primary DCI. After acquiring the primary DCI, the UE may analyze the primary DCI to determine the secondary DCI. In some embodiments, the secondary DCI may include control information for data transmission in the corresponding shortened TTI.

In S104, data transmission is performed between the UE and the base station in a second shortened TTI scheduled by the secondary DCI.

In some embodiments, when determining the secondary DCI, the UE may be scheduled to a shortened TTI corresponding to the secondary DCI, and performs data transmission with the base station based on control information for data transmission contained in the secondary DCI.

In the above embodiments, based on the configuration information of shortened TTIs received from the base station, the UE blindly detects the predetermined physical downlink link control channel with a period of each shortened TTI, to acquire the primary DCI. Besides, the UE determines the secondary DCI based on the acquired primary DCI to schedule to the corresponding shortened TTI within which data transmission is performed between the UE and the base station. In this way, the UE may switch between blind detection of channel and scheduling of the primary DCI, which makes the shortened TTIs be scheduled flexibly in a simple way and applicable to various UEs.

Figure 2:
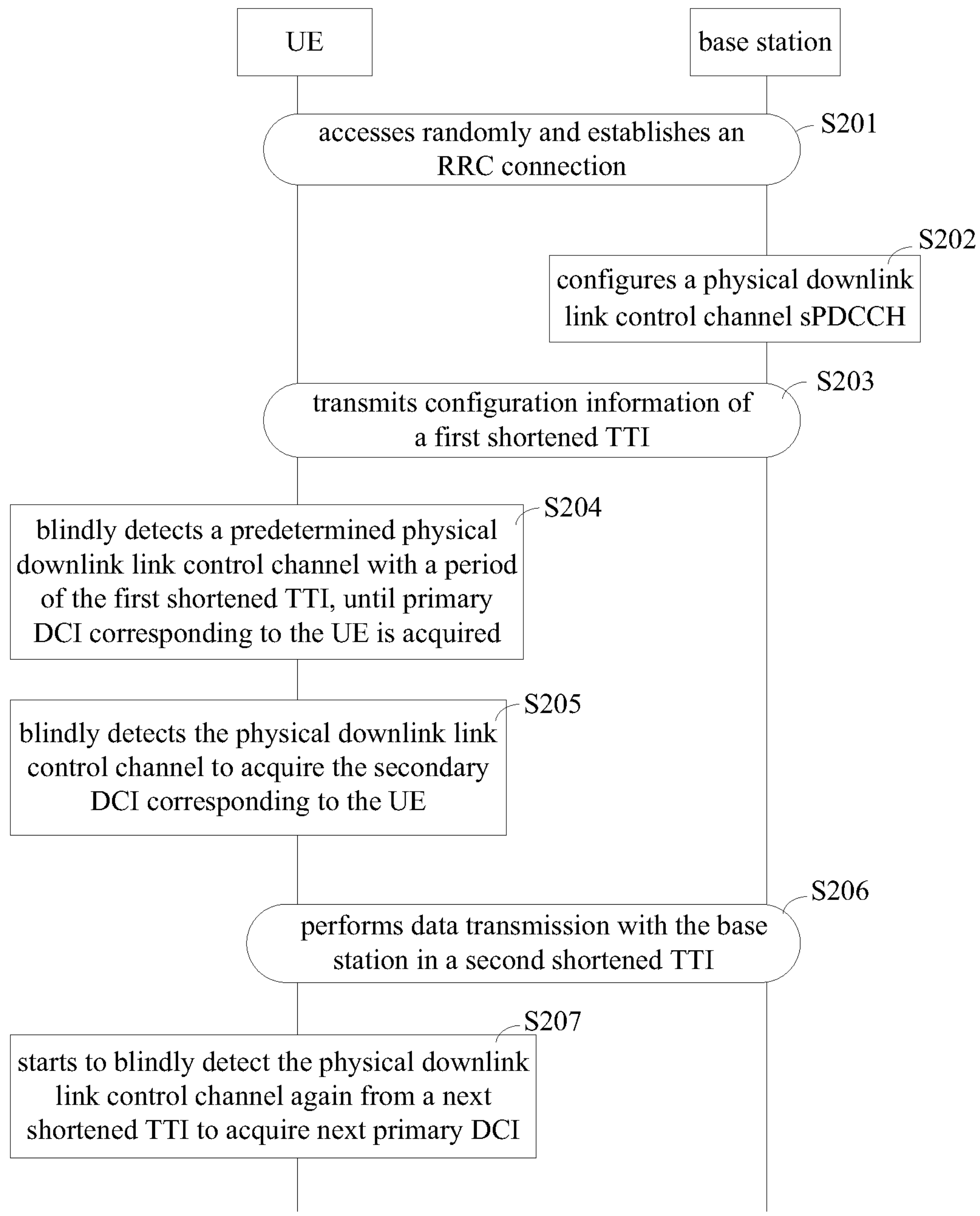
FIG. 2 schematically illustrates a data flow diagram of a data transmission method of UE according to an embodiment.

Hereinafter, a data transmission method of UE provided in an embodiment is described in detail in conjunction with FIGS. 2 and 3.

In S201, a UE accesses a communication system randomly and establishes a Radio Resource Control (RRC) connection with a base station.

In S202, the base station configures a physical downlink link control channel sPDCCH which carries a primary DCI.

In some embodiments, the physical downlink link control channel sPDCCH is a newly defined physical downlink link control channel which differs from a common Physical Downlink Control Channel (PDCCH) in existing techniques.

In S203, the base station transmits configuration information of a first shortened TTI to the UE.

In some embodiments, the base station may configure a shortened TTI according to practical requirements. For example, the base station may configure two OFDM symbols, and a common TTI may include seven shortened TTIs.

In S204, the UE blindly detects a predetermined physical downlink link control channel with a period of the first shortened TTI, until primary DCI corresponding to the UE is acquired.

In some embodiments, after receiving configuration information of a shortened TTI, the UE may blindly detect a physical downlink link control channel sPDCCH corresponding to the shortened TTI in the shortened TTI based on configuration information of the shortened TTI, which is called an initial blind detection state of the UE. The physical downlink link control channel sPDCCH is blindly detected with the period of the first shortened TTI, until the primary DCI corresponding to the UE is acquired. In some embodiments, how many times the UE blindly detects the physical downlink link control channel sPDCCH in each shortened TTI may be determined according to practical requirements, such as 32 times.

In S205, when acquiring the primary DCI corresponding to the UE, the UE acquires configuration information of secondary DCI by analyzing the primary DCI, and blindly detects the physical downlink link control channel to acquire the secondary DCI corresponding to the UE.

In some embodiments, when acquiring the primary DCI corresponding to the UE through the blind detection, the UE terminates the initial blind detection state where blind detection is performed to the physical downlink link control channel sPDCCH, and enters a primary DCI scheduling state. When entering the primary DCI scheduling state, the UE may analyze the primary DCI first to acquire the configuration information of the secondary DCI corresponding to the UE. Besides, the primary DCI may further include control information for data transmission, time-frequency resource configuration and other control information in the first shortened TTI.

In some embodiments, the configuration information of the primary DCI may include a format, an effective time and a position of the secondary DCI.

In some embodiments, the format of the secondary DCI may be determined based on practical requirements, for example, one of form 1, form 2, . . . , form n. The base station may add format information of the secondary DCI into the primary DCI and dynamically adjust the format of the secondary DCI according to practical requirements, so as to meet different requirements. In some embodiments, the base station may select a format as a default format of the secondary DCI according to practical requirements. When the primary DCI does not include the format information of the secondary DCI, the UE may determine that the format of the secondary DCI is the default format, which may save signaling resources.

In some embodiments, the position of the secondary DCI may be scheduled and set according to detailed requirements by the base station. In some embodiments, the position of the secondary DCI may be determined by bit mapping.

In some embodiments, the effective time of the secondary DCI may be set according to detailed requirements. In some embodiments, the base station may set in the primary DCI a current sub-frame or N sub-frames from the current sub-frame to be the effective time of the secondary DCI. For example, if the effective time is three sub-frames including a current sub-frame and two following sub-frames, the UE is scheduled with at least one shortened TTI having the same position, and uses data in the secondary DCI to transmit control information, and uplink and downlink data transmission is performed between the UE and the base station. In this way, cross-sub-frame scheduling of the UE is realized. The UE does not need to blindly detect the physical downlink link control channel sPDCCH in all the shortened TTIs, which may save resources and reduce the complexity of scheduling.

In S206, the UE performs data transmission with the base station in a second shortened TTI scheduled by the secondary DCI.

In some embodiments, the secondary DCI may include configuration information for controlling data transmission, such as physical resource block allocation, format information of modulation and encoding, uplink transmission power control information or Hybrid automatic repeat request (HARQ) feedback of uplink data transmission. The UE analyzes the acquired secondary DCI to obtain the information for controlling data transmission used in the data transmission between the UE and the base station in the second shortened TTI corresponding to the secondary DCI, and performs the data transmission with the base station in the scheduled second shortened TTI.

In S207, when a frame number of transmitted data exceeds the exit frame number, the UE starts to blindly detect the physical downlink link control channel again from a next shortened TTI to acquire next primary DCI.

In some embodiments, the exit frame number is used to indicate the UE to remain a current secondary DCI unchanged within each sub-frame in the exit frame number, and to blindly detect the physical downlink link control channel sPDCCH again to acquire next primary DCI when the exit frame number is exceeded. Therefore, the UE does not need to be always in the initial blind detection state where the physical downlink link control channel sPDCCH is blindly detected, which may reduce system overhead.

When a frame number of transmitted data exceeds the exit frame number, the UE starts to blindly detect the physical downlink link control channel sPDCCH again to acquire new primary DCI currently carried on the physical downlink link control channel sPDCCH, so that new secondary DCI and a new exit frame number are determined. In some embodiments, a format, an effective time and a position of the new secondary DCI may be the same as or different from those of the current secondary DCI. The above process is performed repeatedly so as to realize flexible scheduling of the UE.

In some embodiments, the second DCI may include an exit indicator for indicating whether the UE needs to return to the initial blind detection state to blindly detect the physical downlink link control channel sPDCCH again and obtain new primary DCI. If the exit indicator is detected to be valid, for example, a binary bit corresponding to the exit indicator is 0, the UE does not need to wait for the end of the exit frame number and starts to blindly detect the physical downlink link control channel sPDCCH again from a next shortened TTI, to acquire new primary DCI and schedule a new shortened TTI according to the new primary DCI and new secondary DCI corresponding to the new primary DC. If the exit indicator is detected to be invalid, for example, a binary bit corresponding to the exit indicator is 1, the UE remains in a current primary DCI scheduling state and does not need to return to the initial blind detection state, until the UE is scheduled to the initial blind detection state again based on the exit frame number or the exit indicator configured in the secondary DCI.

In some embodiments, to save resources, a portion of the secondary DCI may be set in the corresponding primary DCI, so that the UE can acquire the secondary DCI without blindly detecting the physical downlink link control channel sPDCCH based on scheduling of the primary DCI. Details of this case can be referred to FIG. 3.

Figure 3:
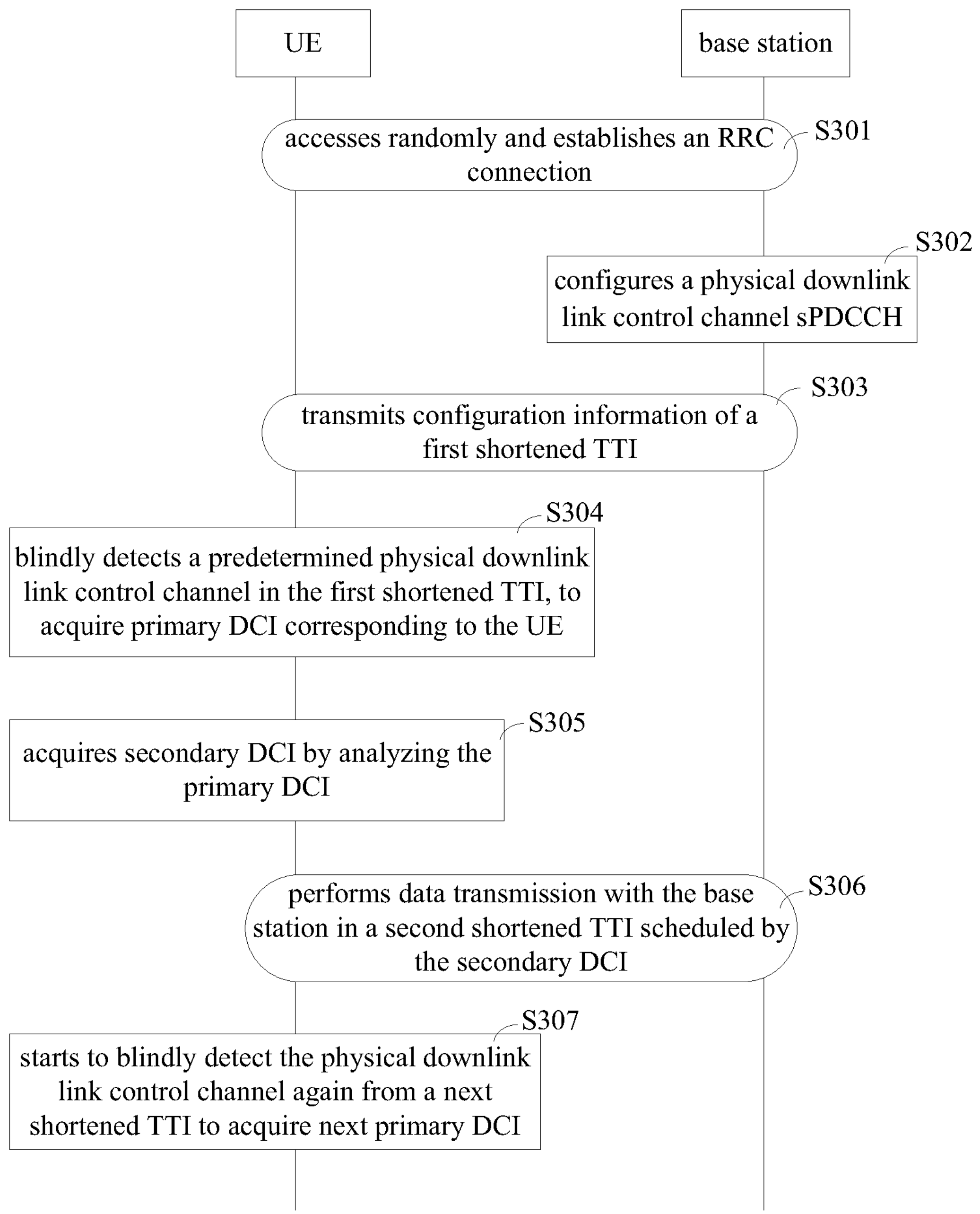
FIG. 3 schematically illustrates a data flow diagram of a data transmission method of UE according to another embodiment.

FIG. 3 schematically illustrates a data flow diagram of a data transmission method of UE according to another embodiment.

In S301, a UE accesses randomly and establishes an RRC connection with a base station.

In S302, the base station configures a physical downlink link control channel sPDCCH which carries first DCI.

In S303, the UE transmits configuration information of a first shortened TTI to the UE.

In S304, the UE blindly detects a predetermined physical downlink link control channel in each shortened TTI, to acquire primary DCI corresponding to the UE.

In S305, when acquiring the primary DCI corresponding to the UE, the UE acquires secondary DCI by analyzing the primary DCI.

In some embodiments, when the primary DCI is acquired by the blind detection, the UE terminates the initial blind detection state where blind detection is performed to the physical downlink link control channel sPDCCH, and enters a primary DCI scheduling state.

When entering the primary DCI scheduling state, the UE may analyze the primary DCI first to acquire the secondary DCI set in the primary DCI. In this way, the UE acquires the secondary DCI by analyzing the primary DCI and without blindly detecting the physical downlink link control channel sPDCCH, which saves resources.

In S306, the UE performs data transmission with the base station in a second shortened TTI scheduled by the secondary DCI.

In S307, when a frame number of transmitted data exceeds the exit frame number, the UE starts to blindly detect the physical downlink link control channel again from a next shortened TTI to acquire next primary DCI.

Details of S301 to S304 can be found in S201 to S204, and details of S305 to S307 can be found in S205 to S207, which are not described in detail here.

In some embodiments, before the frame number of transmitted data reaches the exit frame number, a portion of the secondary DCI may be set in the primary DCI, so that the UE can directly acquire the secondary DCI by analyzing the primary DCI. Besides, configuration information of rest secondary DCI may be set in the primary DCI, and the UE can acquire the configuration information of the rest secondary DCI by analyzing the primary DCI, and further acquire the rest secondary DCI from the physical downlink link control channel according to the configuration information. The method in FIG. 2, the method in FIG. 3 or a combination of them may be selected to be performed according to practical requirements.

Figure 4A:
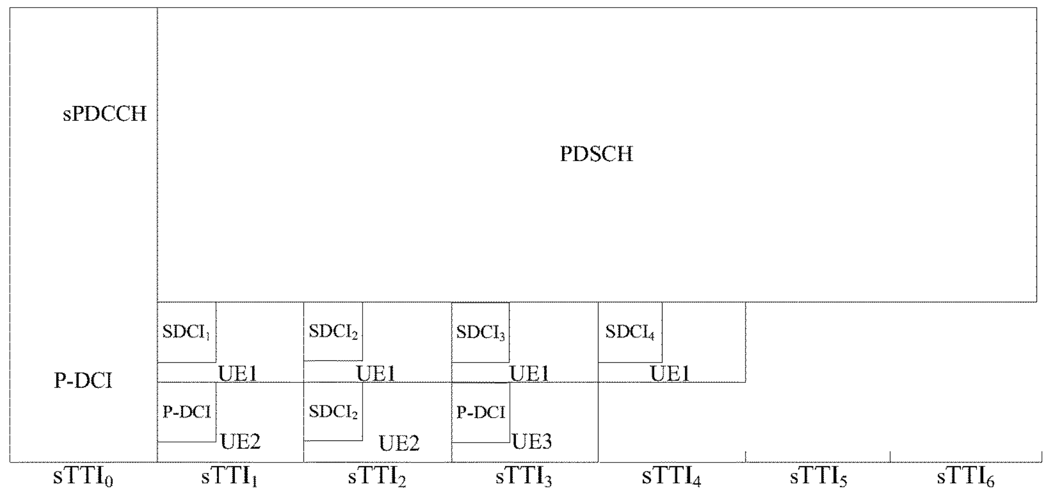
FIGS. 4*a* to 4*c* schematically illustrate diagrams of scheduling of data transmission of a UE using a data transmission method provided in an embodiment.
Figure 4B:
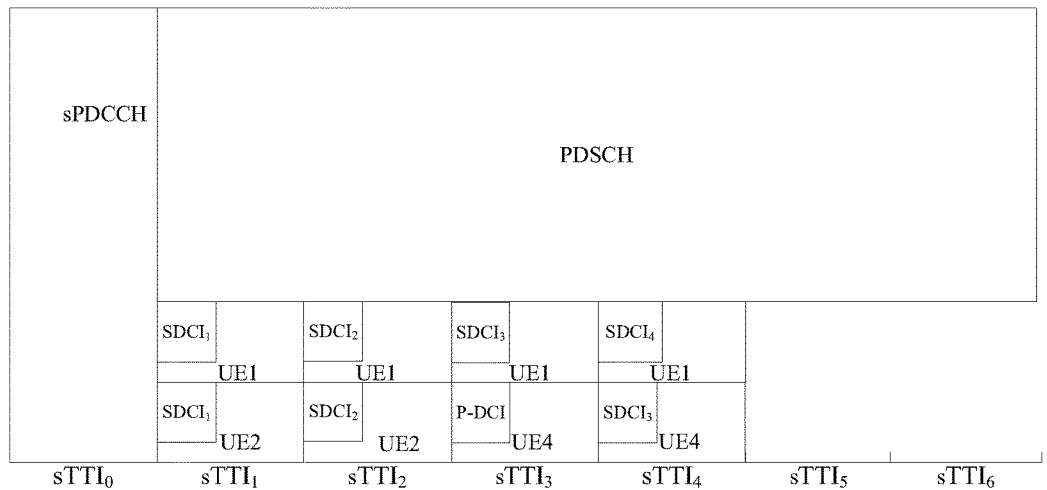
Figure 4C:
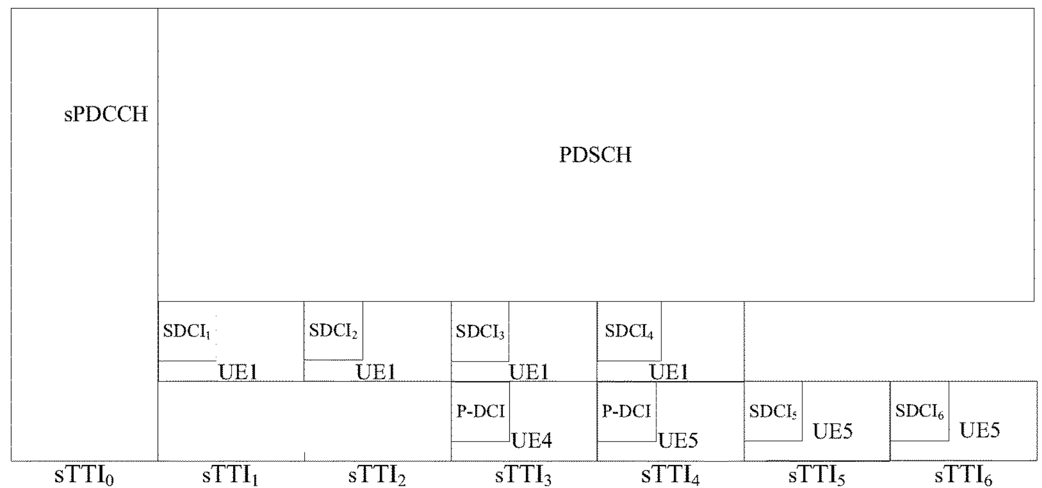

FIGS. 4*a* to 4*c* schematically illustrate diagrams of scheduling of data transmission of a UE using a data transmission method provided in an embodiment. Referring to FIGS. 4*a* to 4*c*, in the embodiment, a shortened TTI configured by a base station includes two OFDM symbols, and a sub-frame includes seven shortened TTIs including $sTTI_0$ to $sTTI_6$. Secondary DCI in the corresponding shorten TTIs include $SDCI_0$ to $SDCI_6$.

UE1 to UE5 take the shortened TTIs as a period respectively to blindly detect a physical downlink link control channel sPDCCH, until primary DCI corresponding to the UE is acquired.

In the first shortened TTI $sTTI_0$ in the current sub-frame, UE1 acquires its primary DCI P-DCI through blindly detection, and determines its secondary DCI to be located in the second to fifth shortened TTIs $sTTI_1$ to $sTTI_4$ based on the primary DCI P-DCI. Afterwards, UE1 blindly detects the physical downlink link control channel sPDCCH again, and acquires corresponding secondary DCI $SDCI_1$ to $SDCI_4$. Afterwards, corresponding shortened TTIs $sTTI_1$ to $sTTI_4$ are scheduled based on control information for controlling data transmission in the corresponding secondary DCI $SDCI_1$ to $SDCI_4$, and UE1 performs data transmission with the base station in the shortened TTIs $sTTI_1$ to $sTTI_4$. Besides, UE 1 may detect that an exit frame number in its primary DCI P-DCI is 3, thus, in following two sub-frames, UE1 acquires secondary DCI whose position is the same as that of the secondary DCI in the current sub-frame, i.e., $SDCI_1$ to $SDCI_4$. Afterwards, corresponding shortened TTIs $sTTI_1$ to $sTTI_4$ are scheduled based on control information for controlling data transmission in the secondary DCI $SDCI_1$ to $SDCI_4$, and UE1 performs data transmission with the base station in the shortened TTIs $sTTI_1$ to $sTTI_4$.

In the second shortened TTI $sTTI_1$ in the current sub-frame, UE2 acquires its primary DCI P-DCI, and determines its secondary DCI $SDCI_1$ and $SDCI_2$ based on the primary DCI P-DCI. The secondary DCI $SDCI_1$ and $SDCI_2$ is included in the primary DCI P-DCI and has an effective time of two frames. Thus, in the current sub-frame and a following sub-frame, UE2 acquires secondary DCI $SDCI_1$ and $SDCI_2$ corresponding to a second and a third shortened TTIs. That is, the second and the third shortened TTIs $sTTI_1$ to $sTTI_2$ in the current sub-frame and the following sub-frame are scheduled based on the secondary DCI $SDCI_1$ to $SDCI_2$, and UE2 performs data transmission with the base station in the shortened TTIs $sTTI_1$ to $sTTI_2$ in the two sub-frames.

In the fourth shortened TTI $sTTI_3$ in the current sub-frame, UE3 acquires its primary DCI P-DCI. Secondary DCI $SDCI_3$ is included in the primary DCI P-DCI and has an effective time of one frame. Thus, the fourth shortened TTI $sTTI_3$ in the current sub-frame is scheduled based on control information for controlling data transmission in the secondary DCI $SDCI_3$, and UE3 performs data transmission with the base station in the shortened TTI $sTTI_3$ in the current sub-frame.

In a fourth shortened TTI $sTTI_3$ in a second sub-frame, UE4 acquires its primary DCI P-DCI, and determines its secondary DCI $SDCI_4$ and $SDCI_5$ based on the primary DCI P-DCI. The secondary DCI $SDCI_4$ is included in the primary DCI P-DCI and has an effective time of two frames. Thus, the fifth and the sixth shortened TTIs $sTTI_4$ and $sTTI_5$ in the current sub-frame are scheduled based on control information for controlling data transmission in the secondary DCI $SDCI_4$ and $SDCI_5$, and UE4 performs data transmission with the base station in the shortened TTIs $sTTI_4$ to $sTTI_5$ in the current sub-frame. Besides, if an exit indicator set in the secondary DCI $SDCI_5$ is valid, the UE4 returns to an initial blind detection state from a next shortened TTI, i.e., $sTTI_6$ in the second sub-frame, and detects next primary DCI P-DCI in a fourth shortened TTI $sTTI_3$ in a third sub-frame. Afterwards, the fourth shortened TTI $sTTI_3$ in the third sub-frame is scheduled, and UE4 performs data transmission with the base station in $sTTI_3$ in the third sub-frame.

In a fifth shortened TTI $sTTI_4$ in the third sub-frame, UE5 acquires its primary DCI P-DCI through blind detection, and determines its secondary DCI to be located in the fifth to seventh shortened TTIs $sTTI_4$ to $sTTI_6$ based on the primary DCI P-DCI. The secondary DCI $SDCI_4$ is included in the primary DCI P-DCI. UE5 determines configuration information of the secondary DCI $SDCI_5$ and $SDCI_6$ based on the primary DCI P-DCI, and blindly detects the physical downlink link control channel sPDCCH again, to acquire corresponding secondary DCI $SDCI_5$ to $SDCI_6$. Afterwards, shortened TTIs $sTTI_4$ to $sTTI_6$ are scheduled based on the secondary DCI $SDCI_4$ to $SDCI_6$, and UE1 performs data transmission with the base station in the shortened TTIs $sTTI_4$ to $sTTI_6$. Besides, an exit frame number in the primary DCI P-DCI is 1. In the following sub-frame, UE5 returns to the initial blind detection state again to acquire new primary DCI.

Those skilled in the art should understand that, to realize solutions in the above embodiments, signaling information configured in the PDCCH including configuration information and/or an exit frame number of the physical downlink link control channel sPDCCHs may be developed in a high-layer configuration message in an LTE system. Accordingly, Physical Hybrid ARQ Indicator Channel (PHICH), and uplink and downlink reference signals in a shortened TTI may be also adjusted and developed according to the configuration information of the shortened TTI. An uplink control channel may be strengthened according to the configuration information of the shortened TTI to adapt data transmission in the shortened TTI.

Hereinafter, a device corresponding to the method in the above embodiments is described in conjunction with FIG. 5.

Figure 5:
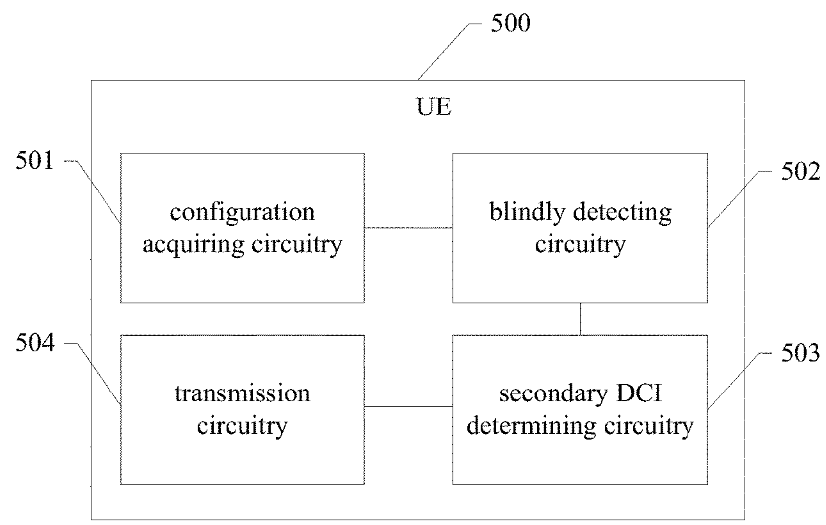
FIG. 5 schematically illustrates a structural diagram of a UE according to an embodiment.

FIG. 5 schematically illustrates a structural diagram of a UE according to an embodiment. Referring to FIG. 5, the UE 500 includes a configuration acquiring circuitry 501, a blindly detecting circuitry 502, a secondary DCI determining circuitry 503 and a transmission circuitry 504.

The configuration acquiring circuitry 501 may be configured to acquire configuration information of a first shortened TTI sent by a base station.

In some embodiments, the configuration information of the first shortened TTI may include a number of OFDM symbols contained in the first shortened TTI.

The blindly detecting circuitry 502 may be configured to blindly detect a predetermined physical downlink link control channel with a period of the first shortened TTI, until primary DCI corresponding to the UE is acquired.

In some embodiments, the primary DCI may include configuration information of an exit frame number.

In some embodiments, the blindly detecting circuitry 502 may be further configured to: when a frame number of transmitted data exceeds the exit frame number, start to blindly detect the predetermined physical downlink link control channel again from a next shortened TTI to acquire next primary DCI.

In some embodiments, if the exit frame number is greater than one, shortened TTIs scheduled by the secondary DCI may be located at a same position in each sub-frame corresponding to the exit frame number.

In some embodiments, the secondary DCI may include an exit indicator.

In some embodiments, the blindly detecting circuitry 502 may be further configured to: when a frame number of transmitted data does not exceed the exit frame number and the exit indicator is detected to be valid, blindly detect the predetermined physical downlink link control channel again to acquire next primary DCI corresponding to the UE.

The secondary DCI determining circuitry 503 may be configured to determine secondary DCI corresponding to the UE based on the acquired primary DCI.

In some embodiments, the secondary DCI determining circuitry 503 may be configured to: acquire configuration information of the secondary DCI by analyzing the primary DCI; and blindly detect the predetermined physical downlink link control channel based on the configuration information of the secondary DCI, to acquire the secondary DCI corresponding to the UE. The configuration information of the secondary DCI may include a format, an effective time and a position of the secondary DCI. In some embodiments, the position of the secondary DCI may be determined by bit mapping.

In some embodiments, the secondary DCI determining circuitry 503 may be configured to analyze the primary DCI to acquire the secondary DCI which is set in the primary DCI.

The transmission circuitry 504 may be configured to perform data transmission with the base station in a second shortened TTI scheduled by the secondary DCI.

From above, based on the configuration information of shortened TTIs received from the base station, the UE blindly detects the predetermined physical downlink link control channel with a period of each shortened TTI, to acquire the primary DCI. Besides, the UE determines the secondary DCI based on the acquired primary DCI to schedule to the corresponding shortened TTI within which data transmission is performed between the UE and the base station. In this way, the UE may switch between blind detection of channel and scheduling of the primary DCI, which makes the shortened TTIs be scheduled flexibly in a simple way and applicable to various UEs.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data transmission method of a User Equipment (UE), comprising:

acquiring first configuration information of a first shortened Transmission Time Interval (TTI) sent by a base station; blindly detecting a predetermined physical downlink link control channel with a period of the first shortened TTI, until primary Downlink Control Information (DCI) corresponding to the UE is acquired, wherein the primary DCI comprises third configuration information of an exit frame number;

determining secondary DCI corresponding to the UE based on the primary DCI, wherein the secondary DCI comprises an exit indicator; and performing data transmission with the base station in a second shortened TTI scheduled by the secondary DCI, when a frame number of transmitted data does not exceed the exit frame number and the exit indicator is detected to be valid, blindly detecting the predetermined physical downlink link control channel again to acquire next primary DCI corresponding to the UE; and when the frame number of transmitted data exceeds the exit frame number, starting to blindly detect the predetermined physical downlink link control channel again from a next shortened TTI to acquire next primary DCI.

2. The data transmission method according to claim 1, wherein the first configuration information of the first shortened TTI comprises a number of Orthogonal Frequency Division Multiplexing (OFDM) symbols contained in the first shortened TTI.

3. The data transmission method according to claim 1, wherein determining secondary DCI corresponding to the UE based on the primary DCI comprises:

acquiring second configuration information of the secondary DCI by analyzing the primary DCI; and blindly detecting the predetermined physical downlink link control channel based on the second configuration information of the secondary DCI, to acquire the secondary DCI corresponding to the UE.

4. The data transmission method according to claim 3, wherein the second configuration information of the secondary DCI comprises a format, an effective time, and a position of the secondary DCI.

5. The data transmission method according to claim 4, wherein the position of the secondary DCI is determined by bit mapping.

6. The data transmission method according to claim 1, wherein determining secondary DCI corresponding to the UE based on the primary DCI comprises: analyzing the primary DCI to acquire the secondary DCI which is set in the primary DCI.

7. The data transmission method according to claim 1, wherein if the exit frame number is greater than one, shortened TTIs scheduled by the secondary DCI are located at a same position in each sub-frame corresponding to the exit frame number.

8. The data transmission method according to claim 1, wherein the primary DCI comprises a first portion of the secondary DCI, and second configuration information of a second portion of the secondary DCI, and wherein determining secondary DCI corresponding to the UE based on the primary DCI comprises:

analyzing the primary DCI to acquire the first portion of the secondary DCI;

acquiring the second configuration information of the second portion of the secondary DCI by analyzing the primary DCI; and blindly detecting the predetermined physical downlink link control channel based on the second configuration information of the second portion of the secondary DCI, to acquire the second portion of the secondary DCI.

9. A User Equipment (UE), comprising:

a configuration acquiring circuitry adapted to acquire first configuration information of a first shortened Transmission Time Interval (TTI) sent by a base station;

a blindly detecting circuitry adapted to blindly detect a predetermined physical downlink link control channel with a period of the first shortened TTI, until primary Downlink Control Information (DCI) corresponding to the UE is acquired, wherein the primary DCI comprises third configuration information of an exit frame number;

a secondary DCI determining circuitry adapted to determine secondary DCI corresponding to the UE based on the primary DCI, wherein the secondary DCI comprises an exit indicator; and a transmission circuitry adapted to perform data transmission with the base station in a second shortened TTI scheduled by the secondary DCI, wherein when a frame number of transmitted data does not exceed the exit frame number and the exit indicator is detected to be valid, the blindly detecting circuitry blindly detects the predetermined physical downlink link control channel again to acquire next primary DCI corresponding to the UE; and wherein when the frame number of transmitted data exceeds the exit frame number, the blindly detecting circuitry starts to blindly detect the predetermined physical downlink link control channel again from a next shortened TTI to acquire next primary DCI.

10. The UE according to claim 9, wherein the first configuration information of the first shortened TTI comprises a number of Orthogonal Frequency Division Multiplexing (OFDM) symbols contained in the first shortened TTI.

11. The UE according to claim 9, wherein the secondary DCI determining circuitry acquires second configuration information of the secondary DCI by analyzing the primary DCI; and blindly detects the predetermined physical downlink link control channel based on the second configuration information of the secondary DCI, to acquire the secondary DCI corresponding to the UE.

12. The UE according to claim 11, wherein the second configuration information of the secondary DCI comprises a format, an effective time, and a position of the secondary DCI.

13. The UE according to claim 12, wherein the position of the secondary DCI is determined by bit mapping.

14. The UE according to claim 9, wherein the secondary DCI determining circuitry analyzes the primary DCI to acquire the secondary DCI which is set in the primary DCI.

15. The UE according to claim 9, wherein if the exit frame number is greater than one, shortened TTIs scheduled by the secondary DCI are located at a same position in each sub-frame corresponding to the exit frame number.

16. The UE according to claim 9, wherein the primary DCI comprises a first portion of the secondary DCI, and second configuration information of a second portion of the secondary DCI, wherein the secondary DCI determining circuitry analyzes the primary DCI to acquire the first portion of the secondary DCI, and wherein the secondary DCI determining circuitry acquires the second configuration information of the second portion of the secondary DCI by analyzing the primary DCI; and blindly detects the predetermined physical downlink link control channel based on the second configuration information of the second portion of the secondary DCI, to acquire the second portion of the secondary DCI.

* * * * *